3,740,304
SYNTHETIC THREAD COMPOSED OF BUNDLED SPLIT TAPE
Munehiro Okumura, Eiji Umemura, and Tatsuaki Nishikawa, Otake, Nobuaki Nishikawa, Gifu, and Hiroyuki Shimoyama, Otake, Japan, assignors to Mitsubishi Rayon Company Limited, Tokyo, Japan
Filed Sept. 21, 1970, Ser. No. 73,777
Claims priority, application Japan, Oct. 20, 1969, 44/83,716; Oct. 25, 1969, 44/85,396
Int. Cl. D02g 3/06; D04h 3/08
U.S. Cl. 161—175           17 Claims

ABSTRACT OF THE DISCLOSURE

The unique synthetic thread of the present invention has a high filling density of 35 to 90% and consists of one or more thermoplastic split tapes of 5 to 300µ thickness. The split tape essentially consists of polyolefin and is composed of numerous fibrous unit strips mutually connected in a network. In the thread, the split tape is tightly bundled in such a manner that the fibrous unit strips located on the periphery portion of the bundle are mutually melt-adhered at point of contact to each other. The unique thread of the present invention is manufactured by passing the split tape through one or more heating dies while being in contact with the inside surface of the heating die heated at a temperature higher by at least 10° C. than the melting point of the tape so as to melt-adhere the fibrous unit strips brought into contact with the heating die at points of contact to each other and thus, to tightly bundle the tape into a thread body.

---

Figure 1:
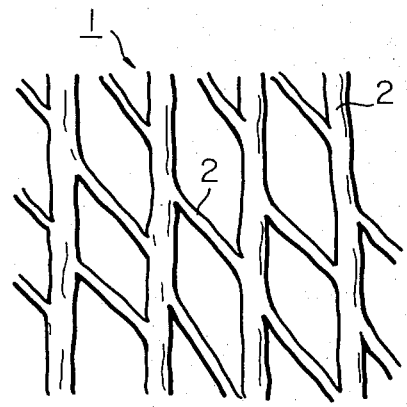

The present invention relates to a unique synthetic thread and more particularly, relates to a unique synthetic thread composed of thermoplastic split tape having a thickness of 5 to 300µ and tightly bundled so as to have a filling density of 35 to 90% and which is manufactured by heat bundling the thermoplastic split tape while passing through a special heating die.

The term "filling density" as used herein, refers to a ratio in percent of a cross-sectional area (a) of the split tape with respect to cross-sectional area (A) of the resultant thread. Accordingly, the "filling density" is determined by the following equation $$\text{Filling density (percent)} = \frac{a}{A} \times 100$$

Generally, it is well-known that the bundling of fibrous masses into a thread form is performed by a twisting process. This process includes the various disadvantages such as limitation of processing velocity due to mechanical restriction of the twisting apparatus, high processing cost for twisting the threads, particularly, thick thread owing to the fact that the thick thread should be successively twisted at two or more stages and simple appearance and hand feeling owing to poor variety of the filling density in a range of about 70±5%.

Also, it is well-known that numerous fine filaments are bundled by adhering them to each other with a resinous binder. However, this method can be applied only to a few kinds of synthetic filaments having high adhesive property such as polyamide filaments and polyvinyl alcohol filaments, but the application of this method to polyolefin filaments such as polyethylene and polypropylene filaments is unpreferable owing to low adhesive property of the polyolefin filaments and too high a cost of the binder effective for the polyolefin filaments. Further, the bundled threads, by the method state above, have an unsatisfactory compressive elasticity.

In addition, the synthetic threads prepared from synthetic resinous tapes, particularly shift tapes, are also well-known and widely utilized in various uses of industrial materials. These synthetic tape threads are bundled by heat-setting at a temperature lower than the melting point of the thread or by twisting. The conventional tape threads thus prepared have various disadvantages such as rough appearance, sandy hand feeling and low processability owing to formation of numerous fibrils on the peripheral surface thereof and low compressive elasticity and low filling density.

It is therefore an object of the present invention to provide a unique synthetic thread having a high filling density, a smooth and elegant appearance and hand feeling, a high compressive elasticity, a high processability and a process of manufacturing the synthetic thread at low cost with high efficiency.

It is a further object of the present invention to provide a unique synthetic thread having an elegant deep color or unique sprinkly color and a process of manufacturing the same.

These and further objects and features of the present invention will become more apparent upon reading the more detailed description set forth hereinbelow.

According to the present invention, the unique synthetic thread is composed of at least one thermoplastic split tape which consists essentially of polyolefin and is composed of numerous fibrous unit strips being connected with each other in a network. In the thread of the present invention, the thermoplastic split tape has a thickness of 5 to 300µ, the fibrous unit strips located on the periphery portion of the thread are melt-adhered to each other at points of contact so as to tightly bundle the thermoplastic split tape ino a thread body having a filling density of 35 to 90%.

According to the present invention, the unique synthetic thread is manufactured through the process wherein at least one thermoplastic split tape of 5 to 300µ thickness, which consists essentially of polyolefin and is composed of numerous fibrous unit strips connected with each other in a network, is passed through one or more heating dies while being in contact with the inside surface of the heating die heated at a temperature higher by 10° C. than the melting point of the thermoplastic split tape so as to mutually melt-adhere the fibrous unit strips brought into contact with the inside surface of the heating die at points of touch to each other and thus, to tightly bundle the thermoplastic split tape into a thread body having a filling density of 35 to 90%.

The unique synthetic thread of the present invention is realized by effectively utilizing the heat-melting property of the thermoplastic resinous tape and cross-sectional configuration and continuity of the fibrous unit strips composing the split tape. The thread of the present invention comprises two constituents, that is, a core component consisting of the fibrous unit strips formed in a bundle and a peripheral component in which the fibrous unit strips are tightly melt-adhered to each other so as to form a smooth shell layer surrounding the core constituent.

When the conventional filaments or fibers having a circular cross sectional profile are bundled into a thread form, the filaments or fibers are brought into contact with each other at lines of touch on the peripheries thereof. Thus, the area of contact with each other is relatively small. This causes difficulty in the adhering of the filaments or fibers to each other in a tight condition. Also, when the conventional split tape is bundled into a thread form and the periphery portion of the thread body is heated so as to melt-adhere the points of touch with each other, the adhering is very defective because of the fact that the number of touch points is less and the area of touch is also smaller. Therefore, the bundling of the resultant thread can be easily broken by a small shock and the appearance of the resultant thread is undesirable. Compared with this, the fibrous unit strips of the split tape have a rectangular cross-sectional profile. Therefore, when the fibrous unit strips are bundled into a thread form, the fibrous unit strips are brought into contact with each other at areas of touch. This can result in tight melt-adhering of the fibrous unit strips to each other.

Based upon the above-stated reason, the peripheral component of the thread of the present invention can be formed more tightly than that from the conventional filament or fiber having the circular cross-sectional profile. Accordingly, the resultant thread of the present invention has a superior stability of bundling and an excellent toughness. Further, in case the adhering points of the conventional filament bundle are broken, the individual filaments are separated from each other. Compared with this, even when the adhering points of the fibrous unit strips in the thread of the present invention are broken, since the fibrous unit strips are originally connected with each other in a network, they can not be separated from each other and thus maintain the bundled thread form.

The thread of the present invention has convenience in that the filling density can be varied in a broader range of 35 to 90%. As described hereinbefore, the conventional twisted thread has a filling density of approximately 70%, which density can be varied only in a narrow range of 70±5%, in general. Basing upon the broad variety of the filling density, the thread of the present invention can have a broad variety of hand feeling from very soft to very stiff.

Particularly, the thread of the present invention can have a filling density higher than 75%, which density is never found in the conventional twisted thread.

Figure 2:
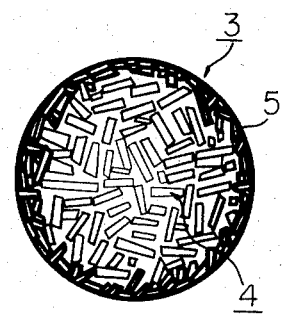
Figure 3:
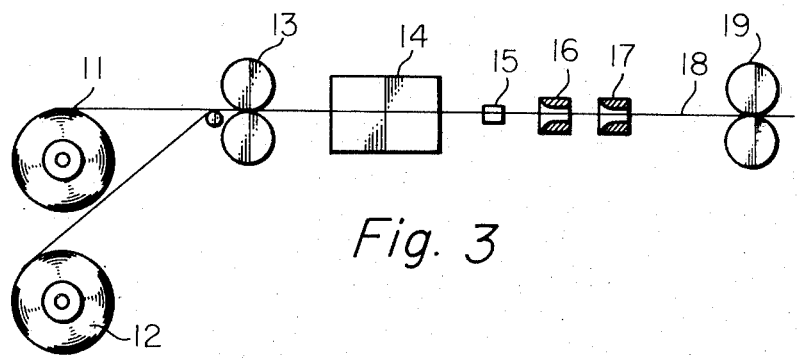
Figure 4:
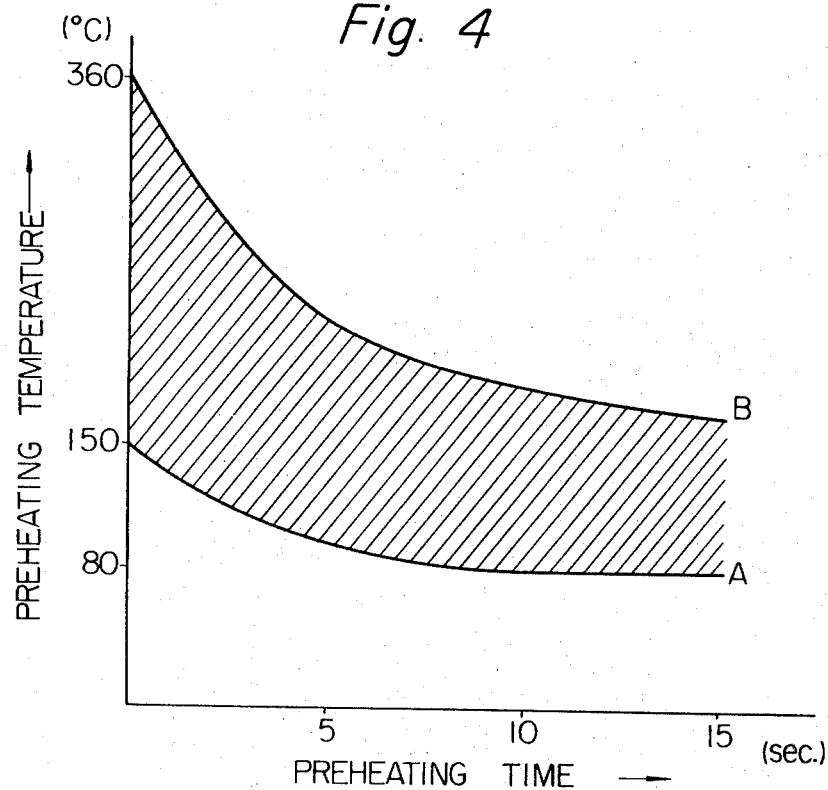
Figures 5A, 5B, 5C:
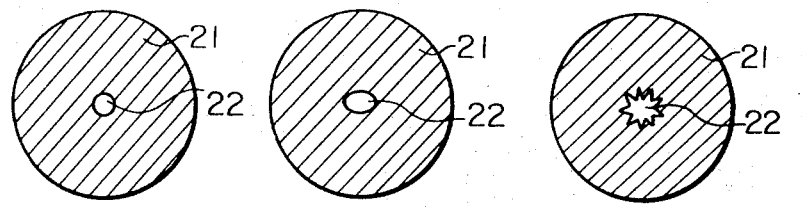
Figure 6:
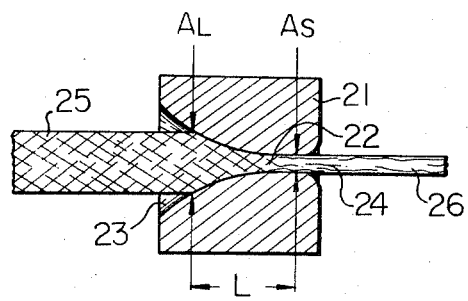
Figure 7A:
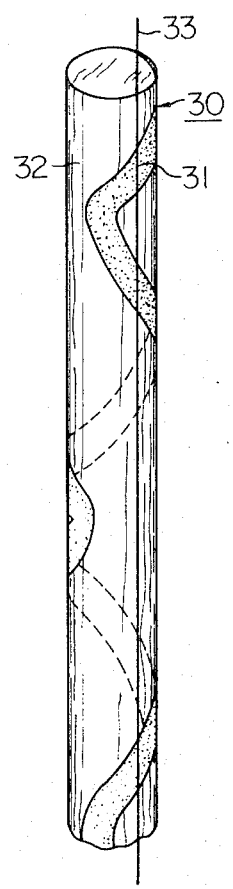
Figure 7B:
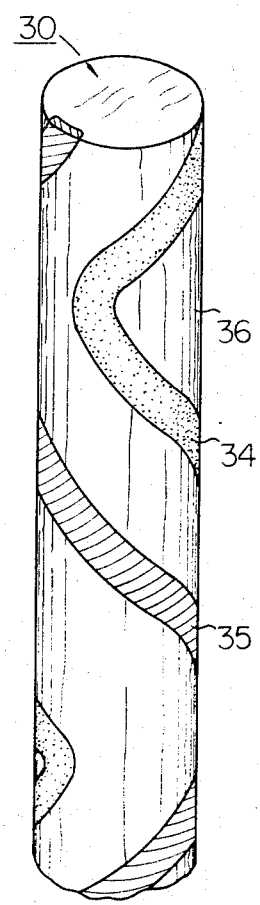
Figure 8:
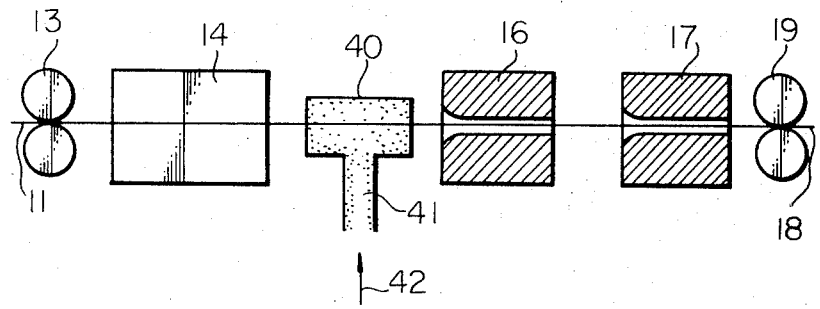
Figure 9:
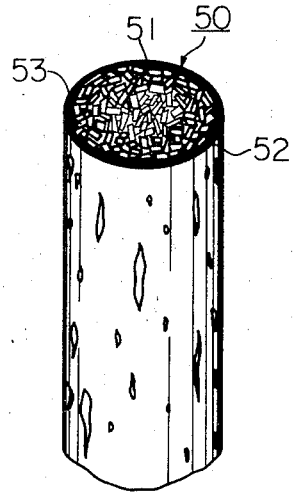
Figure 10:
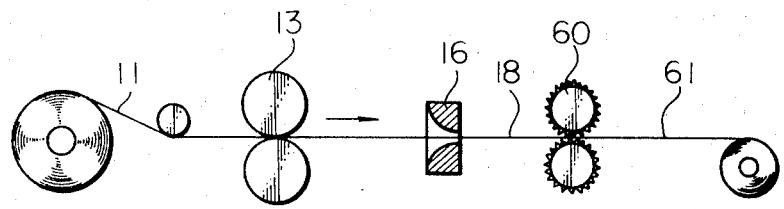

Further features of the present invention are illustrated by the accompanying drawings, in which:

FIG. 1 is a model view of fibrous unit strips of thermoplastic split tape usable for the present invention, FIG. 2 is a cross-sectional model view of thread of the present invention, FIG. 3 is a schematic view of an apparatus for manufacturing the thread of the present invention, FIG. 4 is a graph showing an optimum relationship between preheating temperature and preheating time, FIGS. 5A to 5C are cross-sectional views of heating dice for bundling thermoplastic split tape into the thread of the present invention, respectively, FIG. 6 is a sectional view of the heating dice along the pass thereof, FIGS. 7A and 7B are side model views of threads containing two or more split tapes according to the present invention, respectively, FIG. 8 is a schematic view of another apparatus for manufacturing the thread of the present invention, FIG. 9 is a model view of another thread of the present invention, and FIG. 10 is a schematic view of still another apparatus for manufacturing the thread of the present invention.

The thermoplastic split tape usable for the present invention is split into numerous fibrous unit strips connected to each other in a network as illustrated in FIG. 1.

Referring to FIG. 1, the split tape 1 is composed of numerous fibrous unit strips 2 which are connected to each other in a systematical network. However, it is unnecessary that the network of the fibrous unit strip be formed in a systematical order. Also, the network may be partially broken. Further, it is never required that every fibrous unit strip always has uniform length or width. The fibrous unit strips preferably have a length of 0.4 to 7 mm. and a fineness of 0.1 to 225 denier.

Referring to FIG. 2, the thread 3 of the present invention comprises a component or core constituent 4 and a peripheral component or constituent 5. In the peripheral or sheath component 5, the fibrous unit strips 2 are tightly melt-adhered and heat-set at points of touch with each other so as to form a compact shell surrounding the core constituent 4. In the core constituent 4, the fibrous unit strips 2 are densely bundled by the peripheral or sheath component 5.

The thermoplastic tape usable for the present invention has a thickness of 5 to 300μ. When the thermoplastic tape has a thickness larger than 300μ, the resultant split tape can not be uniformly bundled in the process of the present invention and the fibrous unit strips in the peripheral constituent are defectively melt-adhered to each other owing to difficulty of melting of the fibrous unit strips having a large thickness. On the other hand, when the thickness of the thermoplastic tape is smaller than 5μ, the resultant split tape has too low a rigidity and resiliency and the resultant fibrous unit strips have a very low tenacity. These properties undesirably cause frequent breakage of the fibrous unit strips during processing and rough appearance of the resultant thread.

The thermoplastic tape usable for the present invention consists essentially of polyolefin which can be formed into a thin film such as polyethylene, including crystalline polyethylenes from medium and low pressure polymerization processes and non-crystalline polyethylene from high pressure polymerization processes, polypropylene, polybutene these copolymers and mixtures and the like.

The thermoplastic tape may contain various stabilizers, colorants, antistatic agents, flame proofing agents, hydroscopic agents and adhesives, so far as the original features of the thermoplastic tape are not degraded.

The thread of the present invention may be prepared from two or more thermoplastic split tapes the same as each other or different from each other. Particularly, in case these thermoplastic split tapes to be bundled into a thread have colors different from each other, the resultant thread can have a unique mixed color or deep color. Such mixed color of the thread can result in a unique appearance of the resultant article from the thread, such as matting, fancy yarns for handwork arts or packing rope and cord. According to the desired use of the manufactured article, the difference between colors of the component thermoplastic split tapes is preferably in a range from 5 to 50 NBS. Such mixed color is effective for creating an appearance like a union matting from two or more threads having different colors from each other and for disguising stains on the article.

In the thread of the present invention, it is very desirable for domestic and industrial use that the thread has a high flame proof property. For this purpose, the thread of the present invention is prepared from the thermoplastic split tape containing a pertinent flame proofing agent, for example, as indicated below.

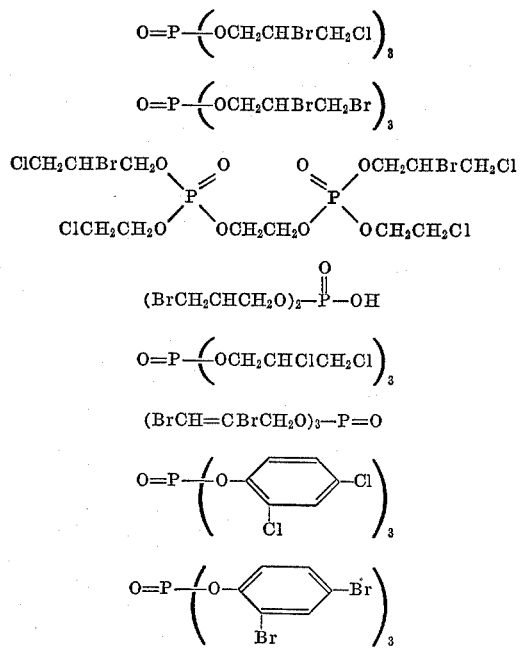

Next, the process of manufacturing the thread of the present invention will be illustrated hereinbelow.

Referring to FIG. 3, thermoplastic split tapes 11 and 12 are fed through a pair of feed rollers 13 to a preheating oven 14 and preferably preheated at a temperature of 80° C. or higher. The preheated tapes 11 and 12 are fed through a tape guide 15 to heating dies 16 and 17 successively. The fed tapes 11 and 12 are tightly bundled into a thread body by passing through the heating dies 16 and 17 while coming in contact with the inside surface of the dies heated at a temperature higher by at least 10° C. than the melting point of the fed tapes 11 and 12. The thread 18 formed thus is delivered by a pair of delivery rollers 19 into a suitable receiving means. The preheating of the thermoplastic split tape is preferable for effecting the tight bundling of the split tape in the heating die. Needless to say, it is essential for tightly bundling the tape to heat the split tape to a desired temperature within a short time while the split tape passes through the heating die. In consideration of this, it is very preferable that the split tape be preheated to a temperature near the desired bundling temperature. This preheating is effective for facilitating not only the melt-adhering of the fibrous unit strips to each other when brought in contact with the heating die, but to partially melt-adhere the fibrous unit strips located in the core constituent to each other during compressing in the heating die. This is very valuable for obtaining a high filling density and toughness of the resultant thread and a high velocity of the processing.

Further, the preheating makes it possible to reduce too high a temperature of the heating die. This is valuable for preventing the resultant thread from having an undesirable rough surface and for increasing the efficiency of the processing and for facilitating handling of the thread.

Preferably, the preheating temperature is 80° C. or higher. Practically, the temperature of the preheating is in the range between line A and line B indicated in FIG. 4 depending upon the length of time of the preheating and kinds of polyolefin tape used.

The heating die for tightly bundling the thermoplastic split tape is a hollow tube having an inside heating surface which comes into contact with the split tape. The inside heating surface is heated to a temperature higher by at least 10° C. than the melting point of the split tape used. The heating die may be arranged in the bundling apparatus by only one, two or more. The arrangement of two or more heating dies is effective for increasing the processing velocity and regulating the surface condition of the bundled thread. The heating die may have various cross-sectional profiles of the path for the split tape, that is, the hollow portion thereof. As is shown in FIG. 5A, generally, the path 22 within the heating die 21 has a circular cross-section. However, the heating die 21 may have a path 22 having an oval cross-section as indicated in FIG. 5B or a star-shaped cross-section as illustrated in FIG. 5C. The oval cross-section is effective for improving the bending property of the resultant thread and the star-shaped cross-section is valuable for obtaining a unique hand feeling due to grooves formed on the surface of the resultant thread along the length thereof.

The cross-sectional area of the path is preferably in a range of 1.1 to 3 times, more preferably, 1.3 to 1.8 times of the cross-sectional area of the split tape used.

The path of the heating die may have a uniform cylindrical form from its inlet to outlet. Desirably, the path has a sectional profile along its length as indicated in FIG. 6.

Referring to FIG. 6, the heating die, 21 has a funnel-shaped path 22 in which an inlet 23 has a larger cross-sectional area and an outlet 24 has a smaller area. The thermoplastic split tape 25 is introduced into the path 22 through the inlet 23 having the greater cross-sectional area and is compressed by coming into contact with the heating surface of the path 22 so as to be bundled into a thread body 26 and then delivered through the outlet having the smaller cross-sectional area.

The path 22 preferably has an effective cross-sectional area $Al$ at the inlet portion and a cross-sectional area $As$ at the outlet being smaller throughout the path satisfying the following equations:

$$1.7 \leq \frac{Al}{X} \leq 20$$

$$1.1 \leq \frac{As}{X} \leq 3$$

$$1.1 \leq \frac{Al}{As} \leq 1.8$$

wherein $X$ is a substantial cross-sectional area of the thermoplastic split tape supplied to the path and can be determined by the equation as indicated below, $$X = \frac{d}{C \times 9 \times 10^3}$$

wherein $d$ is a fineness in denier of the thermoplastic split tape and $C$ is a specific gravity of the thermoplastic split tape.

Needless to say, the effective cross-sectional area $Al$ is equal to the apparent cross-sectional area of the bundled tape and the smallest cross-sectional area $As$ is nearly equal to the apparent cross-sectional area of the resultant thread.

In the general heating die, for obtaining the thread having an elegant appearance in a high efficiency, it is desirable that the path have the smallest cross-sectional area $As$ from 0.06 to 6 mm.² and an effective heating length $L$ from 0.6 to 120 mm.

When the ratio $As/X$ is smaller than 1.1, the resultant thread has an undesirable high stiffness, while when the ratio $As/X$ is larger than 3, the thermoplastic split tape can not be sufficiently bundled.

The process of the present invention is generally effected to the thermoplastic split tape having a fineness from 400 to 13,000 denier. Therefore, when the area $As$ is smaller than 0.06 mm.$^2$, it is difficult to pass the split tape through the path without breakage of the split tape. When the area $As$ is greater than 6 mm.$^2$, the handling efficiency for the supplied split tape is extremely reduced so that the processing is required to be carried out at a very low velocity. Such low velocity causes over melting of the bundled thread periphery and thus results in a rough appearance.

If the effective heating length $L$, in which the supplied split tape is brought into contact with the periphery surface of the path is smaller than 0.6 mm., the split tape can not be sufficiently heat-bundled due to shortage of the heating period. Also, if the effective heating length $L$ is greater than 120 mm., a low efficiency of the processing is desired from a large frictional resistance of the path against the split tape passing therethrough.

Provided that the ratio $Al/As$ is greater than 1.8, the resultant thread has an undesirable low resiliency owing to insufficient heat bundling of the split tape. Also, provided that the ratio $Al/As$ is smaller than 1.1, the following defects are caused.

(1) The frictional resistance of the path periphery surface against the split tape passing therethrough is very high thereby decreasing the processing efficiency.

(2) The split tape is so over-compressed as to result in a thread having an undesirably high stiffness and low resiliency.

The temperature of the heating die can be determined at will in consideration of the efficiency of processing and the aimed property of the thread so as to be higher by at least 10° C. than the melting point of the supplied thermoplastic split tape.

The present invention includes a process of manufacturing a unique synthetic thread comprising at least two thermoplastic split tapes having a color different from each other, in which thread a center line of at least one split tape intersects a line drawn at will on the surface of the other tape along the length of the thread at 5 to 150 points per meter in a manner as indicated in FIGS. 7A and 7B. Referring to FIG. 7A, in a tape 30, a tape 31 meanders on the other tape 32 so as to intersect a line 33 drawn at will on the surface of the thread along the length of the thread 30 at numerous points. Referring to FIG. 7B, in a thread 30, two tapes 34 and 35 meander on another tape 36.

In the conventional thread being composed of two or more colored tapes, they are merely doubled along the length of the thread. Therefore, these colors of the componental tapes run along the length of the thread on two or more lines. Such color lines cause undesirable appearance-like defective lines on a woven matting.

Compared with this, in the colored thread of the present invention as stated above, the tapes having a color different from each other are incorporated into a thread body in such a manner that one or more tapes meander on the other tape by means of a traverse guider for the meandering tape. Therefore, the resultant thread can be prevented from having the above-stated defective lined appearance and can have a sprinkly color like the twisted yarn containing two or more fibers or filaments having colors different from each other.

If the intersecting points are less than 5 points/meter, the above-mentioned effects are never obtained. Also, if the intersecting points are greater than 150 points/meter, the resultant thread appears as having a simple color and the processing efficiency is decreased so as to elevate the manufacturing cost of the thread.

The thread of the present invention may contain a resinous adhesive agent therewithin. The adhesive-containing thread can be prepared from the thermoplastic split tape which is previously impregnated with a solution of the resinous adhesive agent such as chlorinated polypropylene, chlorosulfonated polyethylene, acrylic polymers, polyvinyl chloride-base resin and styrene-butadien copolymeric gum in an organic solvent such as toluene, xylene, trichloroethylene, tetrachloroethylene and the like. The impregnated split tape is dried so as to retain the solvent at a content less than 10% based on the weight of the solid adhesive agent and then supplied to the preheating or heat-bundling by the heating dice. The adhesive agent is effective for reinforcing the melt-adhering of the fibrous unit strips to each other.

The resinous adhesive agent may be supplied to the thermoplastic split tape by the manner as illustrated below. That is, the resinous adhesive agent prepared in a fine powder form is supplied to the split tape preferably preheated to 80° C. or a higher temperature, by the apparatus as indicated in FIG. 8. Referring to FIG. 8, a tape 11 supplied into the preheater 14 through a pair of feed rollers 13 is heated to a desired temperature therein.

The preheated tape 11 passes through a resinous powder supply means 40 wherein the tape 11 is covered with a resinous powder 41 blown onto the tape by an eddy stream of a heating medium 42. The covered tape 11 is fed to the heating dies 16 and 17 wherein the resinous powder 41 on the tape 11 is fused so as to form a fused resinous layer on the bundled tape and reinforced to melt-adhere the fibrous unit strip. As is illustrated in FIG. 9, the resultant thread 50 comprises the core constituent 51, the peripheral constituent 52 and a thin resinous constituent 53 covering the peripheral constituent 52.

The thread of the present invention may be formed into a flat form by pressing with a pressing calendar. Further, the thread of the present invention may be formed into an engraved form in a prescribed pattern by embossing with an embossing calender. Referring to FIG. 10, the thread 18 passed through the heating die 16 is embossed into an embossed thread 61 with a pair of embossing calenders 60 on which numerous embossing protuberances are formed in a prescribed pattern. The resultant embossed thread 61 has a unique appearance like knitted thread and an elegant hand feeding.

The thread of the present invention may be cooled to a plasticizing temperature of the thread or lower after passing through the heating die. This cooling may be carried out by passing through a cooling chamber or bath containing a cooling medium such as cold air or water.

After passing the thread through the heating die, if the thread of high temperature is delivered by a pair of nip rollers and/or cut at a prescribed length, the thread can not maintain its circular cross-sectional profile due to being pressed at a temperature higher than the plasticizing temperature by the nip rollers and it is very difficult to cut the thread due to its too high a softness.

However, the cooled thread has a high resiliency sufficient for maintaining its circular cross-sectional profile even after being pressed by the nip rollers and has a high hardness, hard enough for cutting it at a high velocity.

The following examples illustrate the present invention.

EXAMPLES 1 TO 4

A film was prepared from isotactic polypropylene having a melting point of 169° C., an isotacticity of 94% and an intrinsic viscosity of 2.0 which was determined in tetrahydronaphthalene of 135° C. by extruding through an extruder at 280° C. The film was slit at 45 mm. width and then drawn at a draw ratio of 8.5 in an oven heated at a temperature of 150° C. The resultant polypropylene tape having a 30μ thickness and a 3,800 denier fineness was split by means of a splitting roller on which numerous splitting pins were fixed in the conventional manner. The split tapes were heat-bundled in the apparatus of FIG. 3, under four conditions as indicated in Table 1. For comparison, the same tapes as that of the present examples were subjected to heat bundling under the conditions as indicated in Table 1 in the same process as that of the present examples.

TABLE 1

| Example Number: | Temperature of preheating (° C.) | Cross-sectional area of heating die (mm.²) | | | Temperature of heating die (° C.) | | | Velocity of processing (m./min.) | Filling density (percent) | Configuration of bundled yarn |
|---|---|---|---|---|---|---|---|---|---|---|
| | | No. 1 | No. 2 | No. 3 | No. 1 | No. 2 | No. 3 | | | |
| 1 | 140 | 0.785 | 0.785 | | 260 | 240 | | 25 | 62.5 | Perfectly bundled. |
| 2 | 180 | 1.13 | 1.13 | 1.13 | 260 | 240 | 220 | 40 | 43.0 | Do. |
| 3 | 70 | 0.785 | 0.785 | | 260 | 240 | | 20 | 62.5 | Substantially bundled. |
| 4 | | 0.95 | 0.95 | | 280 | 220 | | 25 | 50.0 | Do. |
| Comparison Example 1 | 160 | 1.54 | 1.54 | | 280 | 220 | | 25 | 32.0 | Not bundled. |

In the resultant bundled threads of Examples 1 and 2, the fibrous unit strips in the periphery portion thereof were sufficiently adhered to each other so as to form a preferable rush thread-like appearance and hand feeling. Thus, the resultant threads of Examples 1 and 2 were useful in substitution for the natural rush thread for manufacturing Japanese tatami mattings and fancy straw mattings.

The films were slit so as to form tapes having a width of 17 mm. and then the tapes were drawn at a draw ratio of 9.0 in an oven heated at a temperature of 150° C. so as to obtain a thickness of 25μ and a fineness of 1,000 denier. The drawn tapes were split by means of a rotating split roller.

The resultant colored tapes (A), (B), (C) and (D) were heat bundled through the apparatus of FIG. 3 under the conditions indicated in Table 2.

TABLE 2

| Example Number | Tape used and its number | Temperature of preheating | Cross-sectional area of heating die (mm.²) | | | Temperature of heating die (° C.) | | | Velocity of processing (m./min.) | Filling density (percent) |
|---|---|---|---|---|---|---|---|---|---|---|
| | | | No. 1 | No. 2 | No. 3 | No. 1 | No. 2 | No. 3 | | |
| 5 | (A) 2 / (B) 2 | 150 | 0.785 | 0.785 | | 340 | 250 | | 40 | 62.5 |
| 6 | (A) 2 / (B) 1 / (C) 1 | 150 | 0.785 | 0.785 | | 340 | 250 | | 40 | 62.5 |
| 7 | (B) 1 / (C) 2 / (D) 1 | 150 | 0.785 | 0.785 | 0.785 | 340 | 300 | 250 | 40 | 62.5 |
| 8 | (C) 2 / (D) 2 | 150 | 0.95 | 0.95 | | 340 | 250 | | 40 | 50.0 |
| 9 | (A) 3 / (D) 1 | 150 | 0.95 | 0.95 | | 340 | 250 | | 40 | 50.0 |

The results of Examples 3 and 4 were substantially bundled. However, the fibrous unit strips in the periphery portion of the bundled thread were insufficiently adhered to each other due to the low temperature of the preheating. Thus, the resultant threads of Examples 3 and 4 had a preferable softness and were useful for producing fancy yarns for manual arts or interior decorations and furniture.

The result of comparison Example 1 was not bundled. Because the diameter of the heating die was so large, the fibrous unit strips in the periphery portion of the bundle were only partially adhered to each other.

EXAMPLES 5 TO 9

Four films were prepared by means of an extruder having a T-dice heated at a temperature of 270° C. from four kinds of polymeric materials each of which contained the same isotactic polypropylene as that of Examples 1 to 4 and any one of the following colorants (A) to (D), respectively.

Colorant: Content (percent) based on the weight of the polymeric material
- (A) Pigment Blue 15 (C.I. 74160) (*1) __ 0.2
  Titanium dioxide _____ 0.1
- (B) Pigment Blue 15 _____ 0.1
  Titanium dioxide _____ 0.2
- (C) Fastogen Green 7 (C.I. 74260) (*2) __ 0.5
  Symuler Fast Yellow 8GTF (*3) _____ 0.15
- (D) Symuler Red 3013 (C.I. 15865) (*4) __ 0.4

NOTE.—(*1), (*2), (*3) and (*4): Trade names of pigments made by Dainippon Ink and Chemicals Inc., Japan.

The resultant threads of Examples 6 and 7 contained tapes (A) and (B) and/or (C) which had colors similar to each other but slightly different in these hues and lightnesses from each other. Thus, these threads had an elegant and deep hue and a facility for stain-disguising. These properties were suitable for use as mattings.

The resultant threads of Examples 8 to 10 contained tapes (B), (C) and (D), (C) and (D) and (A) and (D), respectively, which were colored green or red. Thus, the resultant thread had uneven colors being mixed green and red, respectively.

These uneven colors had an especially elegant feeling.

The threads of Examples 6 to 8 had a high filling density of 62.5% and a high stiffness and thus were suitable for use as mattings in substitution for the natural rush thread.

The threads of Examples 9 and 10 had a moderate filling density of 50% and softness and thus, were useful for mattings and furniture and interior decorations is embossed.

EXAMPLES 10 to 13

Three films were prepared through means of an extruder heated at a temperature of 260° C. from three materials each of which contained the same isotactic polypropylene as that of Examples 1 to 4 and any one of the following colorants (E) to (G), respectively.

Colorant: Content (percent) based on the weight of material
- (E) Fastogen Green 7 (C.I. 74260) _____ 0.4
- (F) Symuler Fast Yellow 8GTF (C.I. 21105) __ 0.2
- (G) Symuler Red 3013 (C.I. 15865) _____ 0.7

The films were slit so as to form tapes having a width of 15 mm. and then the tapes were drawn at a draw ratio of 8.0 in an oven heated at 150° C. temperature so as to obtain a thickness of 23μ and a fineness of 1,000 denier. The drawn tapes were split by means of a rotary splitting roller. The tapes having the color (E), (F) or (G) were combined with each other in four manners indicated in Table 3 and then subjected to heat-bundling in the apparatus of FIG. 3 under conditions as indicated in Table 3.

of the componental colored tapes. In these resultant mattings, each color was linearly run along the thread.

In the resultant matting from Comparison Example 3, the mixed colors undesirably seemed to be a unicolor owing to a too sufficient mixing effect of the componental colored tapes. Thus, this resultant matting had a simple hue undesirable for the purpose of the present invention.

The resultant mattings from the threads of Examples 10 to 13 had a unique and elegant color and no weaving defect-like fault was found on the resultant mattings.

TABLE 3

| Example No. | Tape used and its number | Meandering number of tape guides (times/min.) | Cross-sectional area of die (mm.²) | | Temperature of die (° C.) | | Velocity of processing, m./min. | Filling density (percent) | Bundling condition |
|---|---|---|---|---|---|---|---|---|---|
| | | | No. 1 | No. 2 | No. 1 | No. 2 | | | |
| 10 | (E) 2 / (F) 2 | 200 | 0.785 | 0.785 | 300 | 240 | 30 | 62.5 | Very good. |
| 11 | (E) 2 / (F) 2 | 1,500 | 0.785 | 0.785 | 300 | 240 | 30 | 62.5 | Do. |
| 12 | (E) 2 / (F) 1 / (G) 1 | | 0.785 | 0.785 | 350 | 220 | 50 | 62.5 | Do. |
| 13 | (E) 2 / (F) 1 / (G) 1 | | 0.785 | 0.785 | 350 | 220 | 50 | 62.5 | Do. |
| Comparison: | | | | | | | | | |
| 2 | (E) 2 / (F) 2 | 30 | 0.785 | 0.785 | 300 | 240 | 30 | 62.5 | Do. |
| 3 | (E) 2 / (F) 2 | | 0.785 | 0.785 | 280 | 230 | 20 | 62.5 | Do. |
| 4 | (E) 2 / (F) 1 / (G) 1 | 0 | 0.785 | 0.785 | 350 | 220 | 50 | 62.5 | Do. |

For comparison, Comparison Examples 2 to 4 were performed, in which Comparison Examples colored tapes (E), (F) and (G) were combined in the manners as indicated in Table 3 and then subjected to heat-bundling under the conditions as indicated in Table 3.

In Examples 10 and 11 and Comparison Examples 2 and 3, two tapes (F) were meandered on the tapes (E), in Example 12, one tape (E) on the tapes (E) and (G), and in Example 13, two tapes (B) and (C) on the tapes (E). In addition, in Comparison Example 4, no tape meandered on other tapes.

All the resultant threads of Examples 10 to 13 and Comparison Examples 2 to 4 were sufficiently bundled.

EXAMPLES 14 TO 16

Three kinds of tapes (H), (I) and (J) having the finenesses and thicknesses indicated in Table 4, respectively, were prepared from a polymeric mixture having a melting point of 168° C. and consisting of a blend polymer of 70 parts by weight of an isotactic polypropylene having an intrinsic viscosity of 2.1 measured in tetrahydronaphthalene at a temperature of 135° C. and 30 parts by weight of a polyethylene produced through a high pressure process and a colorant as indicated in Table 4 by extruding it through an extruder at a temperature of 280° C., splitting at widths as indicated in Table 4 and then drawing at a temperature of 150° C. at a draw ratio as indicated in Table 4.

TABLE 4

| Symbol of colored tape | Colorant | Content, percent based weight of material | Width split tape (mm.) | Draw ratio | Resultant tape | |
|---|---|---|---|---|---|---|
| | | | | | Thickness (μ) | Fineness (denier) |
| H | Symuler Fast Yellow 8GTF. | 0.4 | 43 | 12 | 10 | 1,000 |
| I | Symuler Red 3-13. | 0.2 | 16 | 10 | 50 | 2,000 |
| J | Symuler Fast Yellow 8GTF. / Symuler Red 3013. | 0.3 | | 9.3 | 8 | 200 | 1,500 |
| K | Fastogen Green 7. | 0.3 | 4.8 | 7.5 | 350 | 1,500 |

Several fancy straw mattings were prepared using the colored threads of Examples 10 to 13 and Comparison Examples 2 to 4 as weft yarn and the commercial cream colored hollow threads as warp yarn.

In the resultant fancy straw mattings from the threads of Comparison Examples 2 and 4, the mixed colors of the threads caused a weaving defect-like appearance on the resultant mattings owing to an insufficient mixing effect The drawn tapes were split using a porcupine roller and then the split tapes were subjected to heat bundling using the apparatus as illustrated in FIG. 3 under the conditions as indicated in Table 5.

For comparison, a tape (K) having 350μ in thickness and 1,500 denier fineness was prepared from the same polymeric mixture as that of Examples 14 to 16 and the colorant indicated in Table 4. The comparison tape (K)

was heat-bundled in the same manner as stated above under the conditions indicated in Table 5.

and a fineness of 3,700 and then the drawn tapes were split by means of the conventional rotary splitter.

TABLE 5

| Tape used and its number | Temperature of pre-heating (° C.) | Cross sectional area of heating dice (mm.²) | | Temperature of heating dice | | Meandering number of tape guides time/min. | Velocity of processing, m./min. | Filling density (percent) |
| --- | --- | --- | --- | --- | --- | --- | --- | --- |
| | | No. 1 | No. 2 | No. 1 | No. 2 | | | |
| Example Number: | | | | | | | | |
| 14........{(H) 2, (I) 1} | 155 | 0.785 | 0.785 | 320 | 250 | 2,000 | 35 | 62.5 |
| 15........{(I) 1, (J) 1} | 155 | 0.785 | 0.785 | 320 | 250 | 2,000 | 35 | 56 |
| 16........{(H) 2, (J) 2} | 155 | 0.95 | 0.95 | 320 | 250 | 2,000 | 35 | 64.5 |
| Comparison: | | | | | | | | |
| 5........{(H) 2, (K) 1} | 155 | 0.785 | 0.785 | 320 | 250 | 2,000 | 35 | 56 |
| 6........{(I) 1, (K) 1} | 155 | 0.785 | 0.785 | 320 | 250 | 2,000 | 35 | 56 |
| 7........{(I) 2, (K) 2} | 155 | 1.33 | 1.33 | 320 | 250 | 2,000 | 35 | 65 |

In Example 14, two tapes (H) were meandered on the other tape (I), in Example 15, one tape (I) on the other tape (J), in Example 16, two tapes (H) on the other tapes (J), in Comparison Example 5, one tape (H) on the other tape (K), in Comparison Example 6, one tape (I) on the other tape (K) and in Comparison Example 7, two tapes (I) on the other tapes (K).

The resultant threads of Examples 14 to 16 were sufficiently bundled and useful for producing Japanese tatami mattings and straw matting-like mattings.

However, the resultant threads of Comparison Example 5 were substantially bundled but the bundled portion had a tendency to split. Further, the resultant threads of Comparison Examples 6 and 7 were not bundled owing to too large a thickness of the tape (K) used.

EXAMPLES 17 TO 14

A film was prepared from isotactic polypropylene having a melting point of 169° C., an isotacticity of 95% and an intrinsic viscosity of 2.0 measured in tetrahydronaphthalene at 135° C. and containing a small amount of an antioxidant by extruding through an extruder at 280° C. The film was drawn at a draw ratio of 8.5 at a temperature of 145° C. so as to obtain a thickness of 15μ. The drawn film was slit so as to obtain a width of 30 mm.

The split tapes were impregnated with the toluene solution of the flameproofing agents illustrated in Table 6 into the percent content based on the weight of the split tape as indicated in Table 7 and then dried so as to evaporate the toluene solvent.

TABLE 6

| Symbol | Flameproofing agent |
| --- | --- |
| (a) | $O=P(OCH_2CHBrCH_2Cl)_3$ |
| (b) | $O=P(OCH_2CHBrCH_2Br)_3$ |
| (c) | 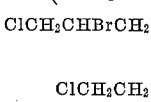 |
| (d) | $(BrCH_2CHCH_2O)_2-\overset{O}{\underset{\|}{P}}-OH$ |
| (e) | $O=P(OCH_2CHClCH_2Cl)_3$ |
| (f) | $(BrCH=CBrCH_2O)_3-P=O$ |
| (g) | 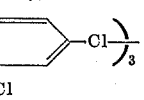 |
| (h) | 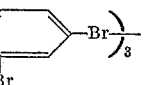 |

The impregnated tapes were heat-bundled by successively passing through two heating dies being heated at 320° C. temperature and having an internal diameter of 1 mm. so as to melt-adhere the fibrous unit strips distributed at the periphery of the bundled tape to each other. The resultant threads had a filling density of 57 to 65%. It was observed that, melt-adhered fibrous unit strips formed a periphery layer, but the fibrous unit strips located in the inner portion of the bundle were free from the influence of the heating and thus the flame proofing agent applied to the split tape was contained in the inner portion.

The solvent for the flame proofing agent may be selected from a wide variety of solvents instead of toluene.

The resultant threads were formed into Japanese tatami matting having a density of 40 thread/inch. The resultant mattings had the flame proofing properties, compressive elasticities and compressive recoveries as indicated in Table 7.

TABLE 7

| Example number | Flameproofing agent Symbol | Pick up (percent) | Compressive Elasticity (percent)[1] | Compressive Recovery (percent)[2] | Flameproof property, methynamine method[3] |
|---|---|---|---|---|---|
| 17 | (a) | 0.2 | 89.0 | 94.0 | SE. |
| 18 | (a) | 3.0 | 88.0 | 94.5 | SE. |
| 19 | (a) | 7.0 | 88.5 | 94.0 | SE. |
| 20 | (a) | 10.0 | 89.5 | 96.0 | SE. |
| 21 | (a) | 15.0 | 87.5 | 96.0 | SE. |
| 22 | (a) | 30.0 | 83.0 | 89.5 | SE. |
| 23 | (b) | 0.3 | 88.5 | 93.0 | SE. |
| 24 | (b) | 0.6 | 89.5 | 93.0 | SE. |
| 25 | (b) | 3.0 | 89.0 | 94.5 | SE. |
| 26 | (b) | 10.0 | 88.5 | 95.0 | SE. |
| 27 | (b) | 30.0 | 82.5 | 89.0 | SE. |
| 28 | (c) | 3.0 | 88.5 | 93.5 | SE. |
| 29 | (c) | 10.0 | 89.0 | 94.0 | SE. |
| 30 | (d) | 3.0 | 88.5 | 94.0 | SE. |
| 31 | (d) | 7.0 | 88.5 | 94.5 | SE. |
| 32 | (d) | 10.0 | 89.0 | 94.0 | SE. |
| 33 | (e) | 3.0 | 88.5 | 94.0 | SE. |
| 34 | (e) | 10.0 | 88.5 | 94.0 | SE. |
| 35 | (f) | 0.6 | 88.5 | 94.0 | SE. |
| 36 | (f) | 3.0 | 89.0 | 93.5 | SE. |
| 37 | (f) | 10.0 | 89.0 | 94.0 | SE. |
| 38 | (g) | 3.0 | 88.5 | 94.5 | SE. |
| 39 | (g) | 10.0 | 89.5 | 94.5 | SE. |
| 40 | (h) | 3.0 | 88.0 | 95.0 | SE. |
| 41 | (h) | 10.0 | 89.0 | 96.0 | SE. |
| Comparision Example 8 | | | 88.5 | 93.5 | Completely burnt. |
| Matting prepared from polypropylene hollow threads | | | 83.5 | 88.7 | Do. |
| Matting prepared from natural rush threads | | | 89.5 | 94.5 | SE. |

[1] Compressive elasticity was determined by the following equation:

$$\text{Percent compressive elasticity} = \frac{L-L'}{L}$$

wherein L represents a compressed length of the testing sample through compressing by Tensilon II type (trade name of a stress-strain testing machine made by Toyo Seiki, Japan) to a compression of 1 kg./cm.$^2$ at a velocity of 5 mm./min. and L' represents a compressed length of the testing sample after releasing the compression.

[2] Compressive recovery was determined by the following equation:

$$\text{Percent compressive recovery} = \frac{l-l'}{l}$$

wherein l represents a compressed length of the testing sample after compressing at a compression of 1 kg./cm.$^2$ for 24 hours and l' represents a residual compressed length of the testing sample after releasing the compression for 24 hours.

[3] Flameproofing property was estimated by the methynamine method wherein a methynamine tablet having a weight of 0.145 g., a diameter of 6 mm. and height of 4 mm. was put on the test matting set up on a straw matting and fired up. The flameproofing properties were expressed as "completely burnt" or "self-fire fighting."

[4] SE means "self-fire fighting" stated above.

For comparison, a tape similar to those of some of the aforementioned examples was subjected to heat-bundling without impregnation with the flameproofing agent and the resultant threads were applied to the preparation of tatami matting similar to those of the present examples. The properties of the comparison matting are shown in Table 7. In addition, the properties of the mattings made up of polypropylene hollow threads and natural rush threads are illustrated in Table 7.

Although the mattings of comparison Example 9 made up of the polypropylene hollow threads had very poor flame proofing property, the mattings of the present invention had superior flameproofing properties and compressive elasticity and recovery similar to those of the natural rush matting.

EXAMPLE 42

A film having a thickness of 41µ and a melting point of 137° C. was produced from polyethylene prepared through the conventional high pressure process by the conventional inflation process. The film was slit by means of a slitter so as to obtain a width of 12 mm. and a fineness of 4,000 denier. The slit tapes were split by means of a rotary splitter. The split tapes were favorably subjected to heat bundling under the following conditions:

Velocity of processing _____ m./min__ 60
Temperature of preheating _____ ° C__ 80
Temperature of heating die _____ ° C__ 250
Internal diameter of heating die _____ mm__ 1.0

The resultant thread was embossed by an embossing calender of which the surface was heated at 120° C. and provided with numerous pyramidal protuberances at a density of 100 protuberances/cm.$^2$. The embossed threads had a flat appearance, a soft hand feeling and a proper sheen and unevenness and were useful for preparing fancy yarns for manual arts.

EXAMPLE 43

The isotactic polypropylene tape having a thickness of 25µ and a fineness of 2,000 denier and a melting point of 169° C. was prepared from an isotactic polypropylene having an intrinsic viscosity of 2.1 measured in tetrahydronaphthalene at 135° C. temperature by extruding through a T-shaped die at a temperature of 285° C. and drawing at a draw ratio of 9.5 at a temperature of 130° C. The draw tape was split by way of an air jet at a pressure of 3.5 kg./cm.$^2$ gauge and a flow rate of 7 Nm.$^3$/hour while running at a velocity of 120 m./min.

The split tape was subjected to heat bundling under the following conditions:

Velocity of processing _____ m./min__ 40
Temperature of preheating _____ ° C__ 140
Temperature of heating die _____ ° C__ 380
Internal diameter of heating die _____ mm__ 0.7

The bundled tape was embossed using an embossing calender having numerous saw tooth-shaped protuberances formed at a density of 28 protuberances/cm.$^2$ at a temperature of 140° C. The resultant embossed flat thread had a tenacity of 8.4 kg. and an elongation at break of 6.4% and thus, was useful for high class packing threads. In addition, if colored to desired colors, the threads were useful for manual arts or decoration.

EXAMPLE 44

A slit tape having a melting point of 139° C., a thickness of 38µ and a fineness of 4,000 denier was prepared from a high density polyethylene by the conventional process and then the slit tape was split by means of a splitter having numerous splitting pins thereon and rotating at twice the velocity with respect to supply velocity of the slit tape. The split tape was impregnated with a toluene solution containing 50% by weight of Hipalon (trade name of a chlorosulfonated polyethylene made by Du Pont de Nemours, U.S.A.) and then squeezed by a pair of mangle rollers so that 50% by weight of the solution remained on the tape. The impregnated tape was heated in a drying oven of 120° C. until the content of toluene in the solution became 7% or less based on the weight of the resin.

The dried split tape was subjected to heat bundling under the following conditions:

Velocity of processing _____ m./min__ 25
Temperature of heating die _____ ° C__ 160
Internal diameter of heating die _____ mm__ 1.0

The bundled split tape thread was dry heated at 130° C. for 30 minutes. Through the above process, the resultant thread had a completely bundled appearance, a smooth peripheral surface and a proper soft handling. The fibrous unit strips in the periphery portion of the thread were securely fixed to each other by melt-adhering and the additional adhesive of Hipalon. The resultant thread completely proved itself against repeated bendings of 120 times.

For comparison, a polypropylene multifilament yarn of 4,000 denier/1,000 filaments was heat-bundled in the same manner as that stated above. The resultant comparison thread did not prove itself against repeated bendings of 50 times and half or more of the componental filaments adhering to each other peeled off from each other.

EXAMPLE 45

A tape was prepared by extruding isotactic polypropylene having a melting point of 169° C., an intrinsic viscosity of 2.0 measured in tetrahydronaphthalene at 135° C. temperature into a film form through an extruder at 280° C. temperature and then slitting at a width of 32 mm. The slit tape was drawn at a draw ratio of 8.5 in an oven heated at 150° C. temperature. The obtained tape had a thickness of 25μ and a fineness of 3,800 denier. The tape was split through a splitter having numerous slitting pins thereon.

The split tape was heat-bundled through the process of FIG. 8 in the following manner.

That is, the split tape was passed at a velocity of 30 m./min. through a first heating die having an internal diameter of 1 mm. and a temperature of 320° C. so as to form a thin layer wherein the fibrous unit strips were adhered to each other. The split tape thus passed was supplied into the resinous powder adding means and thus, a resinous powder was added consisting of 99.5 parts of crystalline polyethylene of a 40,000 molecular weight produced by the low pressure process and 0.5 part of Fastogen Green 7. The resinous powder adhered to the split tape by 2% based on the weight of the split tape. Next, the split tape was passed through the second heating die having an internal diameter of 1 mm. and a temperature of 240° C. so as to melt the added resinous powder on the periphery of the bundled split tape. Through the process stated above, the split tape was formed into a bundled thread having a peripheral layer of an average thickness of 5μ wherein the fibrous unit strips adhered to each other by partial melting of themselves and the molten resinous powder.

The resultant thread was a sprinkly colored green and had a very high abrasion resistance. Accordingly, the thread was useful for the use of Japanese tatami matting and fancy straw mattings.

EXAMPLE 46

The thread prepared in Example 1 was passed through a cooling bath of 1 m. length containing cooling water of 20° C. successively after passing through the heating die. The cooled thread had a substantially circular cross-sectional profile even after delivering through a pair of nip rollers and was subjected to cutting with a cutter. However, the thread just after passing through the heating die was deformed into a flat form by being delivered through the nip rollers and cut by the cutter at an unfavorable condition.

What we claim is:

1. A synthetic thread comprising: at least one thermoplastic split tape having a thickness of 5 to 300μ and consisting essentially of polyolefin and being composed of numerous fibrous unit strips connected with each other in a fibrous network, and wherein said fibrous unit strips located along a peripheral portion of said thread are mutually melt-adhered together at points of contact with each other to tightly bundle said split tape into a thread body having a filling density of 35% to 90%.

2. A synthetic thread as claimed in claim 1, wherein said thread comprises at least two thermoplastic split tapes.

3. A synthetic thread as claimed in claim 2, wherein each of said thermoplastic split tapes has a color different from the other tapes.

4. A synthetic thread as claimed in claim 3, wherein a center line of at least one split tape intersects a line optionally drawn on a surface of said thread along a length of said thread at 5 to 150 points per meter.

5. A synthetic thread as claimed in claim 1, wherein said thermoplastic split tape contains at least one agent selected from the group consisting of antistatic agents, flame proofing agents, hydroscopic agents and adhesives.

6. A synthetic thread as claimed in claim 1, wherein said thread has a flat form.

7. A synthetic thread as claimed in claim 1, wherein said thread has a flat form embossed in a prescribed pattern.

8. A synthetic thread as claimed in claim 1, wherein said thread is impregnated with a resinous adhesive agent and wherein melt-adhering of said fibrous unit strips is reinforced by said resinous adhesive agent.

9. A synthetic thread as claimed in claim 1, wherein said thread is covered with a thin resinous layer.

10. A synthetic thread comprising at least one thermoplastic split tape having a network of fibrous unit strips bundled into an elongated thread having a core component comprising a densely packed array of fibrous unit strips surrounded by a sheath component of fibrous unit strips which are mutually heat-set to each other at their contact points, and wherein said fibrous unit strips each have a thickness between 5–300 microns and a collective cross-sectional area at any location along the thread between 35%–90% of the total cross-sectional area of the thread.

11. A synthetic thread according to claim 10; wherein said at least one thermoplastic split tape comprises two thermoplastic split tapes each formed into a network of fibrous unit strips.

12. A synthetic thread according to claim 10; wherein said at least one thermoplastic split tape consists essentially of polyolefin.

13. A synthetic thread according to claim 10; including a layer of resinous material covering the exterior of said sheath component.

14. A synthetic thread according to claim 10; wherein the thread has a generally oval cross-sectional configuration.

15. A synthetic thread according to claim 10; wherein the thread has a generally star-shaped cross-sectional configuration.

16. A synthetic thread according to claim 10; wherein the thread has a circular cross-sectional configuration.

17. A synthetic thread according to claim 10; wherein said fibrous unit strips have a length from 0.4 to 7 mm. and a fineness from 0.1 to 225 denier.

References Cited

UNITED STATES PATENTS

| 3,081,519 | 3/1963 | Blades et al. | 161—173 X |
| 3,189,506 | 6/1965 | Cobb et al. | 156—296 |
| 2,939,200 | 6/1960 | Ewing et al. | 161—176 X |
| 3,293,844 | 12/1966 | Wininger et al. | 57—157 |
| 3,398,441 | 8/1968 | Adachi et al. | 28—72 |
| 3,401,517 | 9/1968 | Spivy | 57—157 |
| 3,402,548 | 9/1968 | Wininger et al. | 57—140 |
| 3,495,394 | 2/1970 | Mohajer | 161—175 X |
| 3,495,752 | 2/1970 | Kim et al. | 225—3 |
| 3,507,608 | 4/1970 | Eirich | 161—176 X |

GEORGE F. LESMES, Primary Examiner

L. T. KENDELL, Assistant Examiner

U.S. Cl. X.R.

156—180; 161—172, 176, 177